H. Mulford,
Crank Paddle.
No 92,741. Patented July 20, 1869.
Fig: 1.
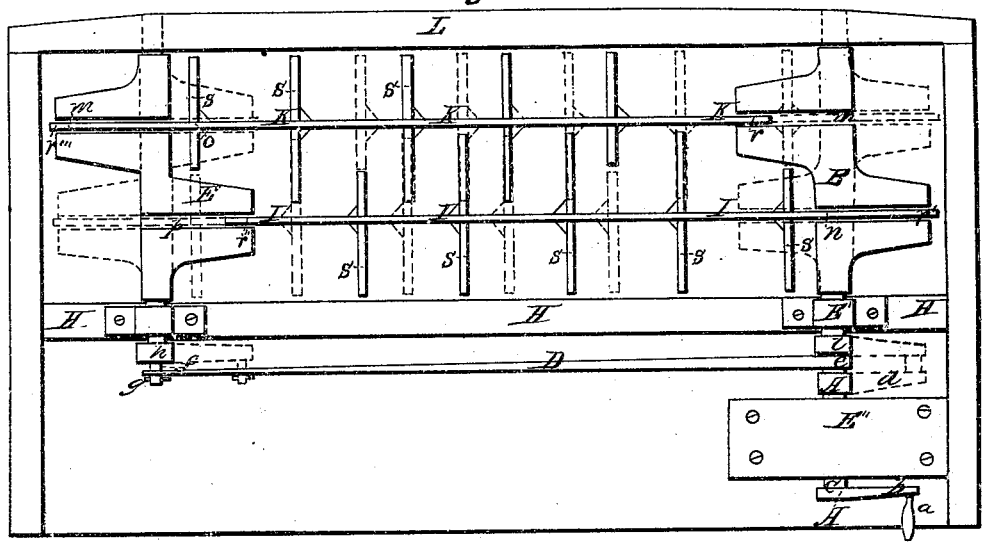
Fig: 2.
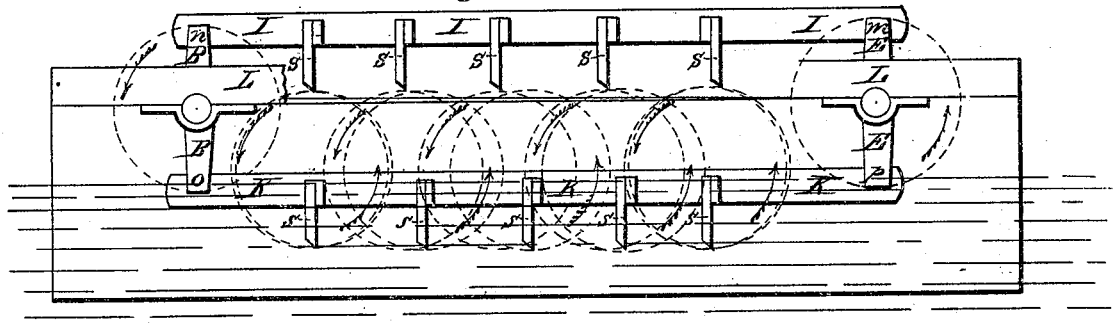
Fig: 4.
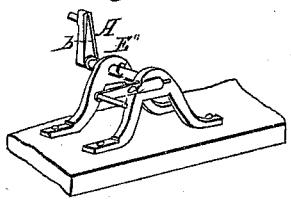
Fig: 3.
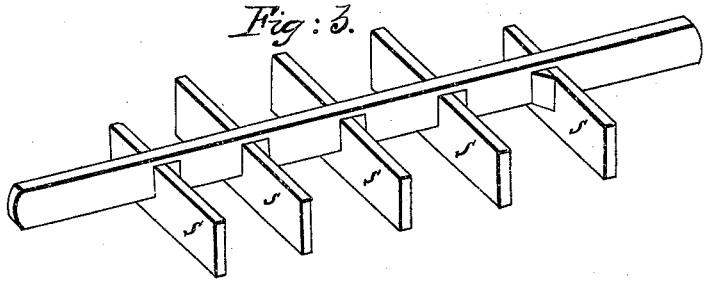
Witnesses:
John C. Cox
R. W. Walker.
Inventor:
Howell Mulford
per Cox & Cox

United States Patent Office.

HOWELL MULFORD, OF PHILADELPHIA, PENNSYLVANIA.

*Letters Patent No. 92,741, dated July 20, 1869.*

IMPROVEMENT IN PROPELLING-APPARATUS.

The Schedule referred to in these Letters Patent and making part of the same.

*To all whom it may concern:*

Be it known that I, HOWELL MULFORD, of the city and county of Philadelphia, in the State of Pennsylvania, have invented a new and useful Mode of Propelling Steamboats and other Vessels navigated by steam; and I do hereby declare that the following is a full and exact description thereof, reference being had to the accompanying drawings, and to the letters of reference marked thereon.

My invention relates to providing a steamboat, or other vessel navigated by steam in the ordinary manner, with two or more horizontal shafts or beams, each provided with paddles, arranged at right angles or transversely across, and attached to the lower portion of such shaft or beam.

These shafts work upon double gearings or cranks at each end, so that the cranks, in turning, alternately bring one shaft after the other into the water, through it, thereby propelling the vessel, and then raise it from the water.

The transverse paddles following the general direction of the shafts, perform reverse concentric revolutions, and pass each other through the spaces by which they are separated.

By means of a connecting-rod attached at one end to a crank, immediately operated upon by the attachment to the engine, and at the other to the journal of the fore double gearing, a mutual movement of both double gearing and the shafts with attached paddles is secured.

The crank immediately acted on by the engine, is supported by a truss or block, and has two arms, one at each end of the axis-bar, both of which stand at right angles to the axis, and the plane of the longest central line of one of which is at an angle of more than forty-five degrees to the plane of the longest central line of the other.

The cranks or double gearings supporting and operating the paddle-shafts, revolve upon journals in boxes, one upon the lower side of the guard of the vessel, the other upon the gunwale of the hull.

To enable others skilled in the art to make and use my invention, I will proceed to illustrate and describe its construction and operation.

The following is a description of the drawings hereto annexed:

Figure 1 represents a ground view of the invention, being a section of the hull of a vessel. The red lines indicate the positions of the shafts, double gearings, cranks, and paddles, when changed by a semi-revolution of the crank A from the position indicated by the black lines.

Figure 2 represents a side view of the invention, as shown in fig. 1, exhibiting the water-line, and the paddle-shafts elevated and in the water. The dotted circles indicate the revolutions of the paddles, the arrows, the direction of their movement.

Figure 3 represents a perspective of the paddle-shaft with attached paddles.

Figure 4 represents a perspective of the crank A, showing the relative position of its arms.

By means of a suitable attachment, I make connection with the engine at the point $a$.

The arms $b$ and $d$ are firmly secured at the opposite ends of and at right angles to the axis $c$ of the crank A, the planes of their longest central lines being at an angle of more than forty-five degrees to each other.

The crank A terminates in the box $e$, passing half way through it, though the journal, composed of the outer end of the crank A and the inner end of the double gearing B, may be a continuation of the half journal of the crank A working in the box E', and a box at the point E''.

It is manifest that when the attachment to the engine is put in motion, the crank A must immediately revolve, since the double gearings B and E, and the connecting-rod D, the paddle-shafts I and K, and the arm $d$, cannot lie in the same plane or in parallel planes with the arm $b$ of the crank A; thus the jar to a vessel, occasioned by the gearing being "on a centre," is avoided, and there is no common centre between the engine and the gearing.

The revolution of the crank A causes the connecting-rod D, attached by the journal at $e$ to the crank A, and to the double gearing E by the journal $f$ and pin $g$, to move in a vertical circle, and thus a mutual and reciprocal movement of the double gearings B and E is effected.

The double gearings B and E are similar in construction and arrangement, and may be formed of a single piece of material.

The double gearing B is supported by a box which contains its outer journal, and is secured to the lower side of the guard L, and in a similar manner by a journal working in the box E' upon the gunwale of the hull H.

The arm $l$ is provided with a half journal working in a box at $e$, whereby the motion is communicated.

The paddle-shafts I and K work in the openings $m$ and $n$ in the double gearing B, and the openings $o$ and $p$ in the double gearing E, upon journals in boxes at the points $r$ $r'$ $r''$ $r'''$. These shafts are provided with paddles $s$ $s$, attached to their lower portions by suitable means, and may be braced.

By the revolutions of the double gearings B and E, the shafts I and K are caused to revolve in vertical circles in opposite directions, and by such revolutions the paddles $s$ $s$ attached to the shafts perform concentric circles in opposite directions, as shown by the dotted circles and arrows in fig. 2, and pass each other through the spaces, by which they are separated, and by these paddles acting upon the water, one set being below the surface at a time, the vessel is propelled.

From the fact that the paddles $s$ $s$, in their revolutions, pass between each other, the space occupied by the usual methods for propelling vessels is by the present invention greatly diminished, and the surface of the covering of the shafts and paddles, being but slightly elevated above the deck, may be used for storage.

I claim the combination and arrangement of the connecting-rod D, the double-crank gearings B and E, with the paddle-shafts I and K, provided with paddles s s, the whole operated as and for the purposes substantially as above described.

In testimony that I claim the foregoing improvement in motive-power for steamboats, as above described, I have hereunto set my hand and seal, this 7th day of May, 1869.

HOWELL MULFORD. [L. s.]

Witnesses:
  JOHN C. COX,
  JOHN S. HOLLINGSHEAD.